Sept. 12, 1961 E. H. B. BARTELINK 2,999,999
HIGHWAY TRAFFIC CONTROL SYSTEM
Filed Feb. 8, 1955 6 Sheets-Sheet 2

INVENTOR.
EVERHARD H. B. BARTELINK.
BY
Ward, Neal, Haselton, Orme, & McElhannon
ATTORNEYS.

Sept. 12, 1961     E. H. B. BARTELINK     2,999,999

HIGHWAY TRAFFIC CONTROL SYSTEM

Filed Feb. 8, 1955     6 Sheets—Sheet 4

INVENTOR.
EVERHARD H.B. BARTELINK.
BY
*Ward, Neal, Haselton, Orndorff McElhaney*
ATTORNEYS.

Sept. 12, 1961　　　　E. H. B. BARTELINK　　　　2,999,999
HIGHWAY TRAFFIC CONTROL SYSTEM Filed Feb. 8, 1955　　　　　　　　　　　　　　　6 Sheets-Sheet 5

INVENTOR.
EVERHARD H. B. BARTELINK.
BY
Ward, Neal, Haselton, Orwel McElhannon
ATTORNEYS.

Sept. 12, 1961  E. H. B. BARTELINK  2,999,999
HIGHWAY TRAFFIC CONTROL SYSTEM
Filed Feb. 8, 1955  6 Sheets-Sheet 6

INVENTOR.
EVERHARD H. B. BARTELINK.
BY
Ward, Neal, Haselton, Orme & McElhannon
ATTORNEYS.

United States Patent Office

2,999,999
Patented Sept. 12, 1961

2,999,999
HIGHWAY TRAFFIC CONTROL SYSTEM
Everhard H. B. Bartelink, P.O. Box 425, Concord, N.H.
Filed Feb. 8, 1955, Ser. No. 486,873
11 Claims. (Cl. 340—31)

This invention relates to traffic control systems and particularly to a system for regulating the speed of traffic on a highway in accordance with the variation of certain conditions on such highway.

It is well-known that the accident rate on the highways has assumed alarming proportions and, accordingly, continuous efforts are being made to increase safety on the roads. One method used to control traffic and to improve the safety on the road has consisted of establishing fixed speed limits for different roads or sections thereof. This method does not take into account the fact that any particular speed limit may be perfectly safe under favorable road conditions while this same limit may be dangerous under adverse conditions.

One object of this invention is to improve safety on highways by introducing a variable speed limit which is controlled and determined as a function of the major parameters which affect the speed that can safely be maintained on the road in question. According to this system, the highway is divided into sections or "blocks" and each of these blocks is provided with its own control system. Thus, for instance, the maximum safe speed computed for level and straight stretches of highways may be radically different from that computed for a section or "block" which covers a mountainous area in which there are sharp curves and steep grades. Means will be described by which the maximum safe speed can be determined automatically and other means will be described which permit manual controls to substitute for, or override, parts of the fully automatic system.

Some of the major facts which determine maximum safe speed are the number of cars present in the block, the visibility in this block, the adhesion, i.e. the amount of traction which the road surface can provide without slipping under the actually existing road conditions, the overall illumination along the road, and the speed of slow cars or "creepers" in the block. Other parameters affecting the maximum safe speed, such as the time of day, may be considered when desired. According to this invention, the numerical value of each of the parameters mentioned above is determined by sensing or measuring apparatus or units. The output of each of these sensing units is applied to computer input units each including a manual control which can either override the output of the sensing unit or substitute for it and also including indicators indicating the value of the parameter which is being transmitted to the computer. The outputs of these computer units are fed to the maximum safe speed computer which computes the maximum safe speed (Sm) as a function of the different parameters determined by the sensing units. The value of the maximum safe speed thus determined by the computer is displayed on a number of indicators spaced along the block.

Other objects and advantages of the invention will be apparent from the following detailed description of the manner in which I now prefer to practice the invention which description should be considered in connection with the accompanying drawings in which.

Figure 1:
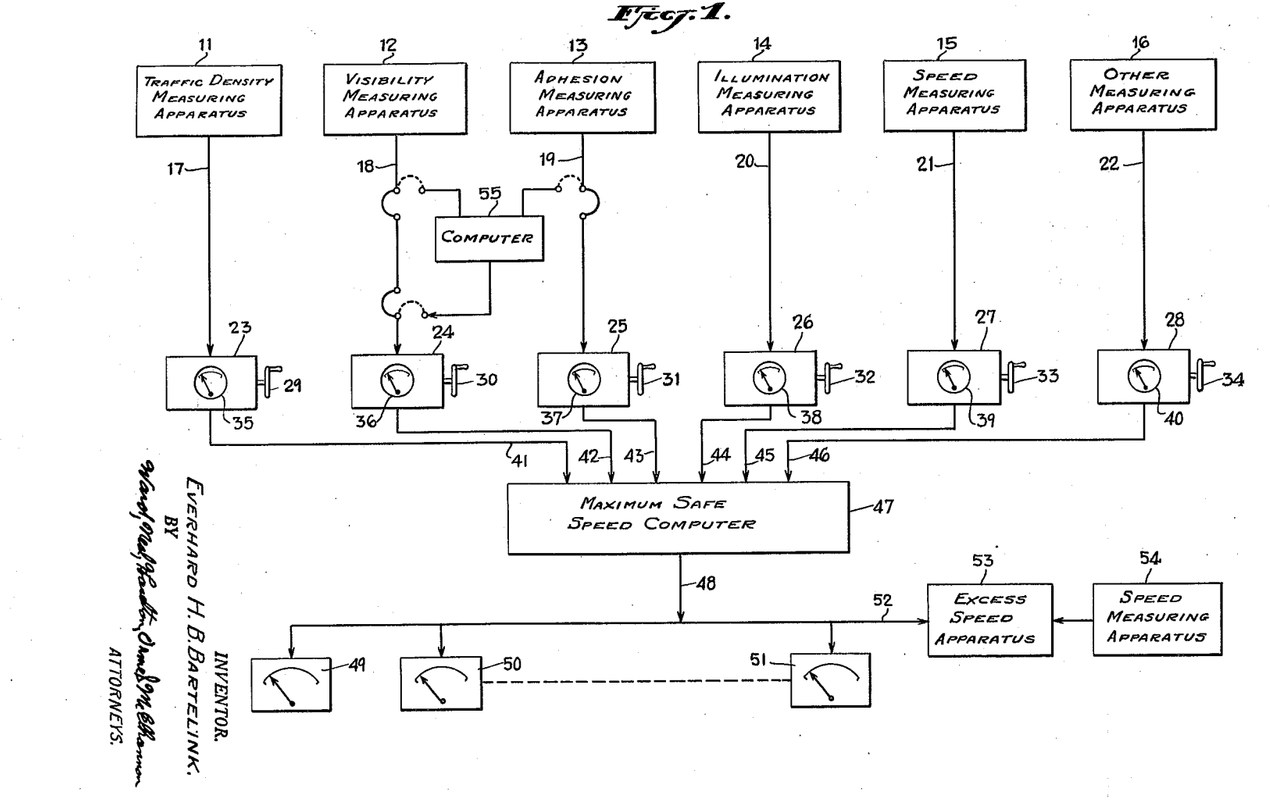
FIG. 1 is a block diagram of one embodiment of the invention.

FIG. 1 is a block diagram of a system of the type described above. Units 11 through 16 are the sensing units or parameter measuring apparatus. Unit 11 determined the density "N" or number of cars in a block or highway section, unit 12 determines the visibility "V" within the block, unit 13 determines the adhesion "A," unit 14 determines the illumination "I" in the area covered by block, unit 15 determines the speed "C" of the "creepers" or slow moving vehicles in the block, and unit 16 determines the other parameters "O" that may be added.

The output of each of the sensing units 11–16 is transmitted by transmission circuits 17 through 22 to the computer input units 23 through 28. These latter units include manual input controls 29–34 which can either override the inputs from 11–16 or substitute for them, and a number of indicators 35–40 which indicate the value of the respective parameters which are fed to the computer. The outputs of the computer input units are connected by means of connections 41–46 which may be mechanical or electrical to the maximum safe speed computer 47. Information corresponding to the maximum safe speed as computed in computer unit 47 is transmitted over data transmission circuits 48 to the maximum safe speed display units 49, 50, 51, etc. It can also be supplied over data transmission circuit 52 to additional devices such as "excess speed" checking apparatus 53 associated with speed measuring apparatus 54.

The parts of the system will be described in further detail hereinafter. However, FIG. 1 shows the overall novel system arrangement and demonstrates that in this system the maximum safe speed is computed and varied according to the measured major parameters affecting this maximum safe speed as they occur on the section of road covered by this computer. Additional identical computer units are used on other sections of the road. The length of these sections does not need to be identical for all blocks and, in fact, the length of a section is preferably determined so as to include sections of road having generally similar overall conditions. It should be noted that the system shown in FIG. 1 can be applied to roads carying two-way traffic as well as to divided highways.

In order to economize on the number of data transmission links required, it may be advantageous to combine the parameters of two or more of the sensing units in a partial computer and to transmit the output from this partial computer over the data transmission circuits to one of the computer input units. Such a partial computer is indicated by numeral 55 in FIG. 1, the dotted lines indicating connections to be substituted for the normal connections indicated by the solid lines. The partial computer 55 is a simplified form of the computer 47 described hereinafter.

The illumination sensing unit or measuring apparatus 14 of FIG. 1 may be a conventional light measuring device which provides an output voltage whose magnitude is dependent upon the light intensity, and its output voltage is used to control the computer input unit 27 as hereinafter described.

The measuring apparatus represented by block 16 may be any form of apparatus which measures a condition which should be considered in determining the safe speed along a highway section. The apparatus may, for example, be a 24-hour clock whose output shaft is connected to one shaft of the differential of the computer input unit described hereinafter in connection with FIG. 10. In this way, the safe speed would vary with the time of day.

Figures 2, 3:
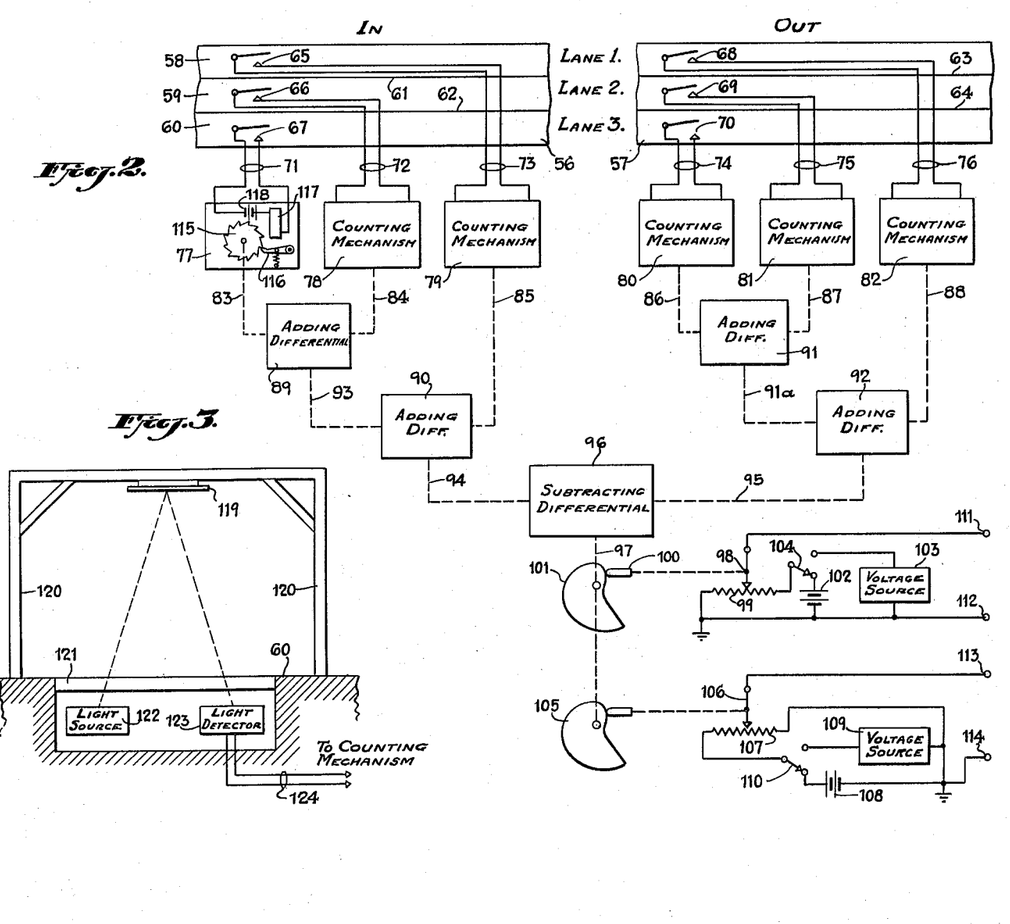
FIG. 2 is a combined block and circuit diagram showing the traffic density apparatus of FIG. 1 in greater detail.
FIG. 3 is a diagrammatic elevation view of an alternative form of a portion of the apparatus shown in FIG. 2.

Referring now to FIG. 2, this figure shows the sensing unit used to determine the number of cars in each block. Eastbound and westbound traffic can be separated on two-way roads in order to permit "In" and "Out" counting of the traffic in both "east" and "west" directions by conventional means, such as by the use of dividing islands. Having thus separated the "east" and "west" traffic on a two-way highway, the remainder of the counting instrumentation can be identical to that shown in FIG. 2 except for the positions of the sensing units. Thus, for example, one pair of units at opposite ends of the block would count the incoming cars whereas another pair of units at opposite ends of the block would count outgoing cars on a two-way road.

Again referring to FIG. 2, there are shown at the top a counting section 56 to determine the number of cars entering the block and a counting section 57 to determine the number of cars leaving the block. In each of these counting sections, the traffic is separated into lanes 58, 59, 60 by lane-separators 61–64. These separators are preferably of the flexible wand type so that collision of a car with a separator will cause no damage but they may also be curbs or other known types of separators. In each of the lanes, there are provided contactors 65–70. These devices 65–70 may be of the contacting type as shown or they may be other devices such as the photoelectric devices shown in FIG. 3 and described hereinafter. The contactors 65–70 may be arranged either to count the number of vehicles or the number of axles entering and leaving the section. Through leads 71 through 76, these devices provide stepping impulses to the counting mechanisms 77–82. For each car or axle recorded by contactors 65–70, these counting mechanisms rotate their output shafts 83–88 by an equal and predetermining number of degrees of rotation. Shafts 83–88 are connected to differentials 89–92 in which the number of degrees of rotation of each of the shafts are added. More particularly, shafts 83 and 84 are connected to the differential 89 which is equipped with suitable gearing to insure that the rotation of its output shaft 93 is equal to the sum of the rotations provided by counting mechanisms 77 and 78. A similar arrangement is provided in differential 91 and its output shaft 91a rotates an amount corresponding to the sum of the rotations of shafts 86 and 87. The combined rotation of the shafts of mechanisms 77 and 78, as transmitted by shaft 93, is applied to a differential 90 in which, through proper gearing, the output of mechanism 79, as determined by its output shaft 85, is added so that the output shaft 94 rotates proportionately to the sum of the rotations of shafts of mechanisms 77, 78 and 79. Similarly, shaft 95 is rotated in proportion to the sum of the rotations of the shafts 86, 87 and 88 of mechanisms 80, 81 and 82. These two shafts are connected to differential 96 which is so arranged that the rotation of its output shaft 97 represents the difference in rotation between shafts 94 and 95. Therefore, the rotation of shaft 97 represents the number of cars which have entered the block minus those which have left the block, i.e. it indicates the total number of cars in the block. Shaft 97 in rotating, positions slider 98 on potentiometer 99, slider 98 being driven by follower 100 which rides on cam 101 driven by shaft 97. The voltage across this potentiometer may be either a fixed battery voltage derived from battery 102 or any other suitable voltage $E_1$ supplied from source 103. These voltages may be selected by means of switch 104. Shaft 97 may also either directly or through a suitable cam 105 move slider 106 on another potentiometer 107. Cam 105 may have the same shape as cam 101 or it may have a different shape depending on the movement of slider 106 desired with the rotation of shaft 97. The voltage across the potentiometer 107 may be derived from battery 108 or may be another voltage $E_1$ supplied by source 109, the selection between these inputs being made by switch 110. By suitable choice of the windings of potentiometers 99 and 107 and of the cams 101 and 105 which operate the sliders 98 and 106, the output voltages at the terminals 111—112, 113—114, may represent the input voltage multiplied by a function of the number of cars; this function may, for instance, be the reciprocal of the number of cars and thus being a measure of the average spacing between cars. It will be noted that the voltage between terminals 111 and 112 varies inversely with respect to the voltage between terminals 113 and 114. Generally speaking, only one of these voltages is required in a given installation and, therefore, one or the other of the cams 101 and 105 and the apparatus operated thereby may be omitted. Also, if the windings of potentiometers 99 and 107 have the proper pitch, the cams 101 and 105 may be omitted, the sliders 98 and 106 being directly driven by the shaft 97.

The counting mechanisms 77–82 may be any known type of mechanism which has an output shaft or other device whose position is related to the number of activations of the input thereof and may, for example, be an electrical stepping mechanism of the type illustrated in block 77. The latter mechanism comprises a ratchet wheel 115 connected to the shaft 83, the wheel 115 being driven by a pawl 116 which is actuated by a solenoid 117. Solenoid 117 is connected in series with an electrical energy source 118 and the contacts of device 67 so that solenoid 117 is energized each time that device 67 is actuated.

Referring to FIG. 3, the devices for operating the counting mechanisms may be light operated devices of the type shown in FIG. 3 rather than devices of the type shown in FIG. 2. Thus, a mirror 119 may be mounted above each lane of the highway, such as by supports 120, the mirror 119 being shown as mounted above lane 69. A light transparent plate or grille 121 is mounted with its top flush with the roadbed and a light source 122 and a light detector 123 are mounted below the plate 121 in such a manner that light from the source 122 is directed on the mirror 119 and is reflected by the mirror on the light detector 123. The output of the light detector 123 is connected by lines 124 to a counting mechanism, such as mechanism 77, so that the counting mechanism is operated each time that light from the source 122 is interrupted by a vehicle passing below the mirror 119. Mirror 119 and the grille 121 may be installed at an angle to the direction of the length of the road so that, for example, a trailer-truck combination will produce only one operation of the counting mechanism.

Figure 4:
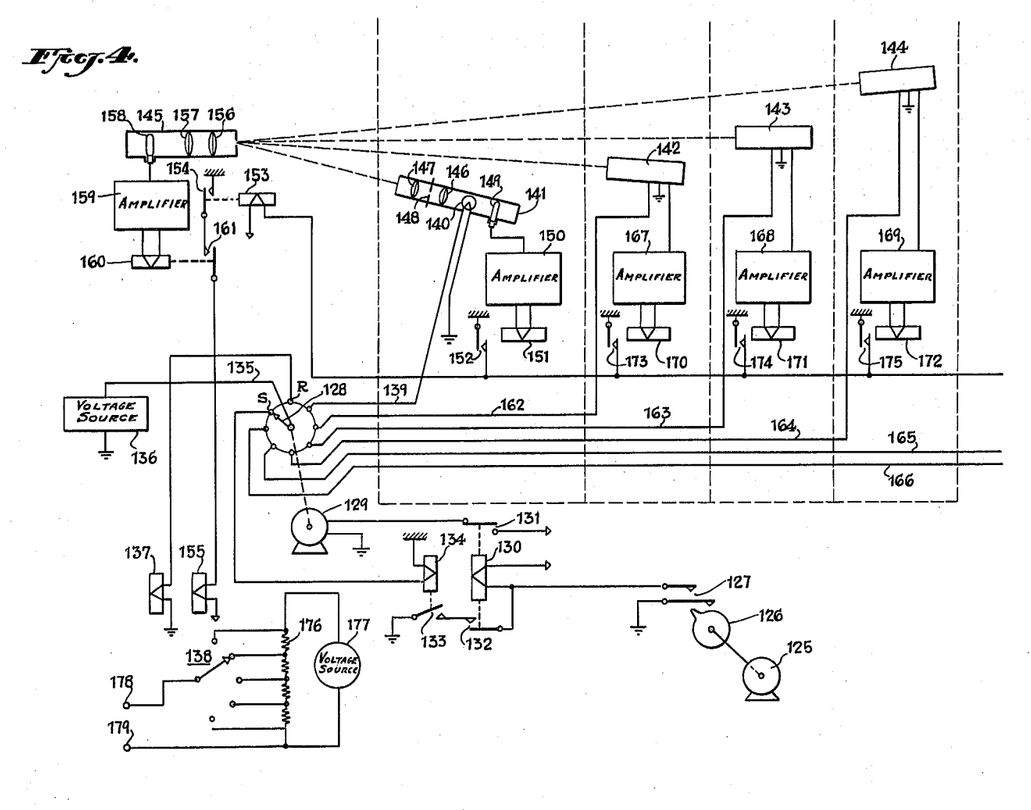
FIG. 4 is a combined block and circuit diagram showing the visibility apparatus of FIG. 1 in greater detail.

Referring now to FIG. 4, there is shown a sensing unit to determine the visibility for any particular location within a block. If appreciable variations in visibility are liable to occur within a block, more than one such sensing device may be installed and the lowest visibility measured by any such devices may be selected and used as the input for the computer. In FIG. 4 there is shown a timing motor 125, operating a timing cam 126 which closes contacts 127 at suitable intervals, for instance, once every five minutes.

By means of circuits to be described later, a sequencing switch 128 is driven by motor 129 in such a way that it will always come to rest on the contact marked "S" on sequence switch 128. Contacts 127, when operated, energize relay 130, thus energizing motor 129 through contacts 131. Relay 130, when operated, closes contacts 132, thus preparing a holding circuit. Note that this holding circuit is interrupted by contacts 133 so long as the slow release relay 134 is kept operated by the battery voltage applied from source 136 through lead 135 to the arm of sequence switch 128 and contact "S." As soon as the motor 129 has advanced to the point where it leaves contact "S," relay 134 is de-energized, thus closing contacts 133 and providing a holding circuit for relay 130. This holding circuit keeps relay 130 energized until such time as the arm of the sequence switch 128 again rests on contact "S." Note that contacts 127 must remain operated for a sufficiently long time to permit relay 134 to release, i.e. until such time as the arm of switch 128 has left contact "S." Thereafter, these contacts must remain open until cam 126 has completed a full revolution. The arm of sequencing switch 128 next applies voltage to contact "R," thus energizing the release magnet 137 of stepping switch 138. Stepping switch 138 is thereby returned to its initial position.

The sequence switch 128 next applies voltage to lead 139 thus energizing lamp 140 in the light impulse transmitter 141. Similar light transmitters 142, 143, 144, etc. are located at increasing distances from the light impulse receiver 145. The light of lamp 140 is beamed by means of lenses 146 and 147 and is directed towards the receiving photocell of receiver 145 by proper orientation of the lamp housing. Each of the light transmitters contains an adjustable iris 148. These irises are adjusted to produce equal light intensities from the various light impulse transmitters, at the receiving aperture of receiver 145. The transmitter 141 also contains a photocell 149 connected to an amplifier 150. Whenever the photocell 149 has detected the transmission of light by lamp 140, it operates a relay 151 which closes contacts 152. Thus, in turn, operates the control relay 153 which, by closing contacts 154, prepares the circuits for stepping magnet 155 of the stepping switch 138. Whenever a light impulse from a distant light impulse transmitter is received by the light impulse receiver 145, lenses 156 and 157 focus the received light on photocell 158. The voltages resulting from this light impulse are amplified in amplifier 159 and energize the impulse receiving relay 160. Relay 160, when operated, closes contacts 161, thus energizing stepping switch relay 155.

When motor 129 advances the arm of switch 128 to its next contact, there is a short period during which lead 139 is de-energized, and lead 162 has not yet been energized by the arm of the switch 128. In this interval no light is received by the light impulse receiver from any of the light impulse transmitters and the stepping relay 155 releases, thus advancing the arm of stepping relay 138 by one step. The operation of these stepping switches is well-known in the art and is, for instance, embodied in the "minor" switches such as are manufactured by Automatic Electric Corporation of Chicago, Ill. (catalog type RA-67, 76 or 77).

The remaining contacts of switch 128 are similarly connected to the lamps of transmitters 142, 143, 144, etc. by leads 163-166, and the photocells in the transmitters 142, 143, 144, etc. are similarly connected to amplifiers 167, 168, 169, etc. which operate relays 170, 171, 172, etc. having contacts 173, 174, 175, etc. for energizing relay 153 in the manner described above.

The irises and light impulse transmitters 141-144, etc. are so adjusted that in clear weather they produce equal light impulses at light impulse receiver 145. When fog, smoke or other conditions reduce the visibility the light impulses transmitted by the light impulse transmitters will be dispersed and therefore the number of pulses received from the different light impulse transmitters is reduced as the pulses of the more distant light impulse transmitters fail to reach the light impulse receiver. Thus the number of pulses received is a direct measure of visibility. The contacts of switch 138 are connected to different potential points on a voltage divider 176 which is connected to a voltage source 177. Since the contact at which the arm of switch 138 will stop is determined by the number of light pulses received, the voltage between the terminals 178 and 179 will be related to the visibility.

Figures 5, 6:
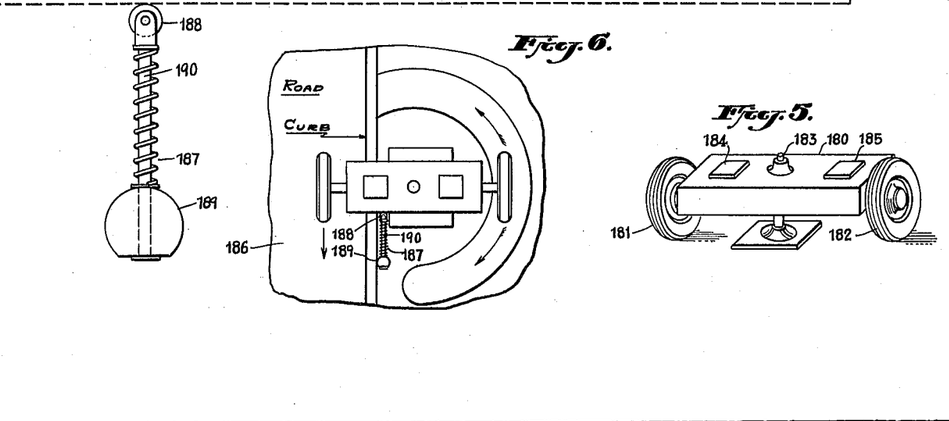
FIG. 5 is a perspective view of a portion of the adhesion measuring apparatus of FIG. 1.
FIG. 6 is a plan view of the apparatus shown in FIG. 5 and illustrates the relationship of such apparatus to a road bed.
Figure 7:
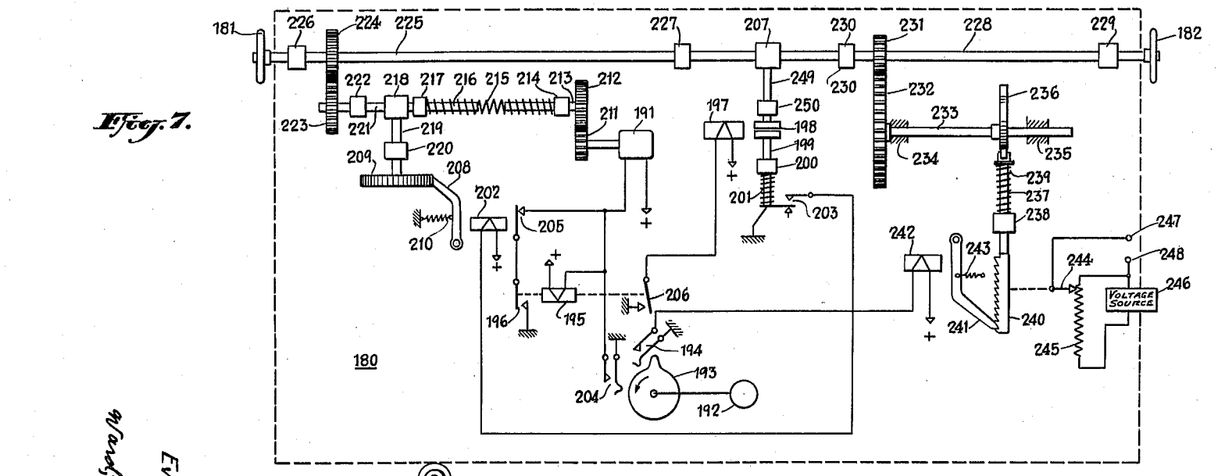
FIG. 7 is a combined mechanical and electrical diagram showing the components forming part of the apparatus illustrated in FIGS. 5 and 6.

Referring now to FIGS. 5–7, there is shown a device for sensing the adhesion coefficient of the road surface. FIG. 5 shows a box-like structure or table 180 supported by two wheels 181 and 182, pivoted around shaft 183 and weighted by weights 184 and 185. As shown in plan view in FIG. 6, the table 180 may be rotated about the shaft 183 so that wheel 181, which is the driving wheel, rests on the roadway 186. When not in use the table 180 may be rotated so that the axis of the wheels 181 and 182 is parallel to the length of the roadway. By means of the driving wheel 181, this table 180 may be moved against the pressure of a spring 187 which holds a roller 188 against it and which at the other end is attached to a post or other rigid structure 189. This spring is guided by a shaft 190 and is able to move freely in an axial direction.

In order to determine the maximum adhesion, wheel 181 is driven against the increasing resistance of spring 187 until slip occurs. The maximum pressure exerted against spring 187 is then measured and used as an indication of the adhesion factor. FIG. 7 shows one form of apparatus for making this measurement. This arrangement contains a device to detect the occurrence of slipping and further means to immediately disconnect the mechanical transmission between the driving motor 191 and the driven wheel 181 when slipping does occur. The device is operated at intervals determined by the timing motor 192 which drives a cam 193 in such a fashion as to make periodic measurements of the adhesion coefficient. At the beginning of such a measurement cycle, cam 193 first closes contacts 194, thereby restoring the mechanism to its starting position as will be described later. In the starting position motor relay 195 is released and its contacts 206 are open, thus breaking the circuit for the operating coil 197 for magnetic clutch 198. Coil 197, when de-energized, releases the clutch plates, and shaft 199, supported by bearing 200, will therefore return to its "normal" position under the influence of spring 201, thus opening the circuit for the differential release magnet 202 at contacts 203. Subsequently cam 193 closes contacts 204 and contacts 204 apply ground to motor 191 and to the motor relay 195. As the differential release magnet 202 is de-energized at this time, relay 195 when operated closes contacts 196 and thereby provides a holding circuit for relay 195 and for the motor circuit over contacts 205 and 196 until such time as relay 202 operates. Relay 195 when operated, closes contacts 206 thus energizing the coil 197, operating the magnetic clutch 198 and connecting shaft 199 to the differential 207. As relay 202 is released, its arm 208 engages the teeth of gear 209 under the influence of spring 210 and locks this gear. Motor 191 through a suitable gear reduction 211 and 212 drives shaft 213 supported by bearing 214. This shaft 213 is connected through spring 215 to another shaft 216, which is supported by bearing 217. Shaft 216 is on the same center line as shaft 213. Shaft 216 is connected to differential 218, and as the third shaft 219 of this differential (supported by bearing 220) is locked by the arm 208, shaft 216 drives shaft 221 (supported by bearing 222) directly through differential 218. Through a suitable gearing mechanism 223 and 224, the motor 191 drives shaft 225 (supported by bearings 226 and 227), and thus the driven wheel 181. As wheel 181 is being driven, it causes the table 180 to move against spring 187 which presses against table 180 through contact roller 188. The other end of the spring 187 is held by a post or other rigid device 189. A sliding shaft or similar device 190 is provided to give guidance to the motion of spring 187.

As the table 180 moves against the pressure of spring 187, the idler wheel 182 at the other side of the table 180 follows the motion of wheel 181 exactly. Idler wheel 182 is attached to shaft 228 which is supported by bearings 229 and 230 and which drives one input of differential 207. One other input of differential 207 is driven by shaft 225. Through a suitable gear reduction 231 and 232 shaft 228 also drives shaft 233 supported by bearings 234 and 235 and carrying cam 236. This cam 236 moves shaft 237 axially in bearing 238 against the pressure of spring 239. The force exerted by spring 239 is kept very small with respect to the force exerted by springs 215 and 187. The same is true for spring 201. As the idler wheel 182 moves, cam 236 drives shaft 237 and the attached ratchet 240. The arm 241 of relay 242 is normally pulled into the ratchet 240 by spring 243, thus preventing return of ratchet 240 to its starting position until magnet 242 has operated and disengaged arm 241. This does not occur until the table 180 has returned to its normal or starting position and, therefore, cam 236 has receded and spring 239 is able to return shaft 237 to its starting position. Shaft 237 is mechanically connected to slider 244 on potentiometer 245. Voltage is applied to the ends of potentiometer 245 by source 246 and the voltage between slider 244 and one end of potentiometer 245 is applied to terminals 247 and 248. As a result the voltage between terminals 247 and 248 is a direct measure of the maximum amount of displacement of table 180 and therefore of the maximum force that has been exerted by the driven wheel 181.

It is desired to immediately disconnect the driving force from the driven wheel 181 as soon as this wheel experiences any slipping at all. Referring again to differential 207, this differential is so connected to shafts 225 and 228 that shaft 249, supported by bearing 250, will be at rest so long as the rotations of shafts 225 and 228 are equal and opposite. This latter condition exists so long as no slip occurs in either wheel. As the load on wheel 182, which consists only of the mechanism required to drive ratchet 240, is negligible there will be no slippage of wheel 182; however, as soon as any slip occurs in wheel 181, shaft 249 will be turned, thereby turning shaft 199 through clutch 198 and closing contact 203. Contacts 203, when closed, operate the differential releasing magnet 202 thus freeing shaft 219 and instantaneously removing all torque in spring 215 and therefore the "drive" of wheel 181. Magnet 202 simultaneously opens contact 205, thereby interrupting the circuit for motor 191 and releasing the holding relay 195. In the absence of any driving torque on wheel 181, table 180 is returned to its original position by spring 187; however, the slider 244 on potentiometer 245 retains the position corresponding to the maximum forces exerted by wheel 181 before slippage occurred. When timing motor 192 has completed the rest of its cycle, cam 193 closes contacts 194, operating magnet 242 thereby releasing ratchet 241 which, together with slider 244, return to the starting position.

Figure 8:
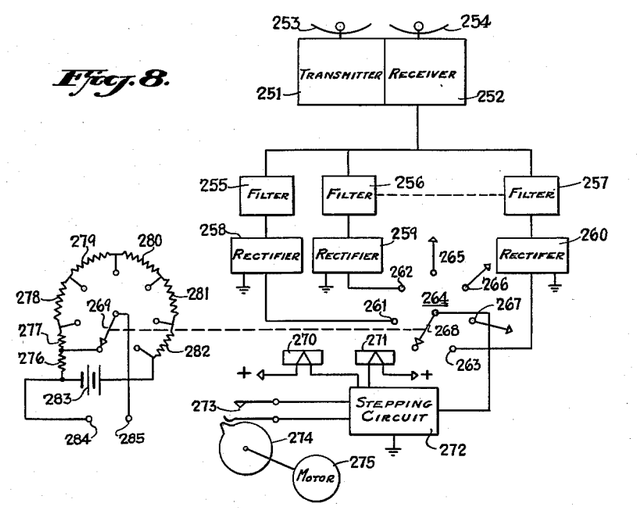
FIG. 8 is a combined block and circuit diagram illustrating the speed measuring apparatus of FIG. 1 in greater detail.

One form of the speed measuring apparatus which may be used to determine the speed of the slowest vehicle within a block or section of a highway is illustrated in FIG. 8. The apparatus includes a well-known type of speed measuring device comprising a radio frequency transmitter 251 and a radio frequency receiver 252, the transmitter 251 having a transmitting antenna 253 coupled thereto and the receiver 252 having a receiving antenna 254 coupled thereto. The receiver 252 compares the frequency of the radio frequency energy reflected by a moving vehicle with the frequency of the transmitted energy and provides a beat frequency output signal whose frequency is related to the speed of the vehicle. Thus, a slow moving vehicle will provide a low frequency signal at the output of receiver 252 and a fast moving vehicle will provide a high frequency signal at the output of receiver 252, the frequency of both signals being in the audio frequency range.

The output of the receiver 252 is coupled to a plurality of filters 255, 256, 257, etc. which filters may be either band pass filters or low pass filters. Thus, filter 255 would pass a signal corresponding to a vehicle speed of 20 miles per hour or would pass signals corresponding to vehicle speeds up to 20 miles per hour; filter 256 would pass signals corresponding to vehicle speeds of approximately 30 miles per hour or would pass signals corresponding to vehicle speeds up to 30 miles per hour, etc. The output of each filter is connected to a rectifier such as rectifiers 258, 259, 260, etc. which rectify the signals passed by the associated filters so that a D.C. voltage appears at the output of a rectifier when it receives a signal from its associated filter. Contacts 261, 262 and 263 of an electrical stepping switch 264 are connected to the outputs of rectifiers 258, 259, 260 and contacts 265, 266, 267 are connected to the outputs of similar rectifiers connected to other filters, such similar rectifiers and other filters being the same as those shown in FIG. 8 but being omitted in the drawing for the purpose of simplicity in illustration.

The stepping switch 264 has a pair of arms 268 and 269 which are driven together. The stepping switch 264 also includes a release magnet 270 which returns the arms 268 and 269 to the position shown when the magnet 270 is energized and a stepping magnet 271 which causes the arms to move in succession to the contacts of the switch 264. Magnets 270 and 271 are connected to a stepping circuit 272 of a type well known in the art which energizes the magnet 271 and causes the arms 268 and 269 to step successively to the various contacts until the arm 268 reaches one of the contacts associated therewith which is at a predetermined potential with respect to ground. When the arm 268 reaches such a contact, the stepping circuit 272 discontinues its energization of magnet 271 so that the arms 268 and 269 remain at positions corresponding to the aforesaid contact until the release magnet 270 is energized. Accordingly, the arms 268 and 269 will stop at positions corresponding to the speed of the slowest vehicle within the range of the transmitter 251 and the receiver 252.

A pair of contacts 273 are associated with the stepping circuit 272 and are periodically closed by a cam 274 driven by a motor 275. When the contacts 273 are closed, the release magnet is energized, returning the arms 268 and 269 to the position shown in FIG. 8 and the stepping circuit 272 is reset. Subsequently, the stepping circuit steps the arms 268 and 269 in the manner heretofore described.

A plurality of resistors 276-282 are connected across voltage source 283 and are connected to the contacts associated with the arm 269. The resistors 276-282 act as a voltage divider and the voltage between the terminals 284 and 285 will be dependent upon the position of the arm 269. Thus, the magnitude of the voltage between the terminals 284 and 285 is related to and will indicate the speed of the slowest vehicle within the range of the transmitter 251 and the receiver 252.

Figure 9:
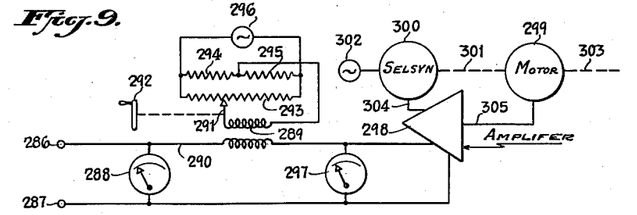
FIG. 9 is a combined block and circuit diagram of one form of computer input unit which may be employed in the embodiment shown in FIG. 1.
Figure 10:
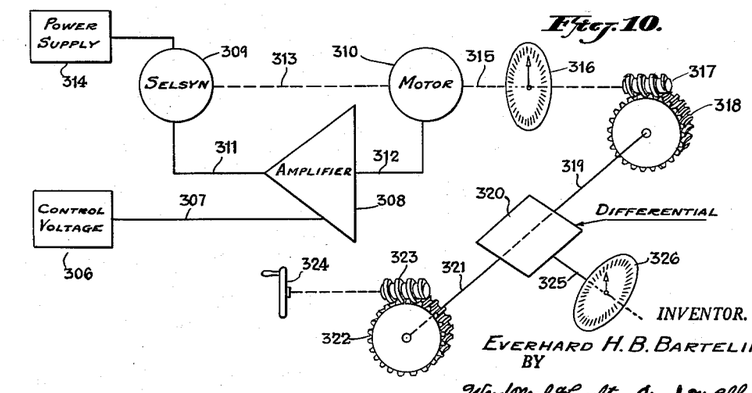
FIG. 10 is a diagram of an alternative form of computer input unit which may be employed in the embodiment of FIG. 1.

The computer input units 23-28 shown in FIG. 1 may be one of the units shown in FIGS. 9 and 10. Referring to FIG. 9, the output voltage of the measuring apparatus or sensing units heretofore described, is supplied to the terminals 286 and 287. The voltage between the terminals 286 and 287 and hence the output of the measuring apparatus or sensing unit is indicated by a meter 288.

The apparatus shown in FIG. 9 may be used when the control voltage supplied to terminals 286 and 287 is an alternating current voltage and manual modificaton of the control voltage is accomplished by means of a transformer 289 whose primary is connected to a manually variable source of A.C. voltage whose secondary is connected in series with lead 290 which is connected to terminal 286. One end of the primary of the transformer 289 is connected to a slider 291 which is manually adjustable by means of a knob or wheel 292. The slider 291 contacts a potentiometer 293, and the opposite end of the primary winding of the transformer 289 is connected to the junction point of a pair of resistors 294 and 295. The opposite ends of the resistors 294 and 295, as well as the opposite ends of potentiometer 293 are connected to an A.C. source 296 which has the same phase and frequency as the sources in the sensing units. Therefore, by varying the position of the slider 291, a voltage can be supplied in series with the voltage between the terminals 286 and 287 which voltage either adds to or subtracts from the control voltage. In this way, the effect of the measuring apparatus or sensing unit on the computed safe speed may be varied manually.

The meter 297 indicates the magnitude of the modified control voltage which is supplied to an amplifier 298 forming part of a servo-system which also includes a servo-motor 299 and a selsyn 300 which are mechanically coupled by a shaft 301. The selsyn 200 is connected to a power supply 302 having the same frequency and phase angle as source 296 and the motor 299 has an output shaft 303 which is connected, as is hereinafter described, to one of the inputs of the computer unit 47. The selsyn 300 and the motor 299 are both electrically connected to amplifier 298 by leads 304 and 305 so that the position of the shaft 303 may be varied by the control voltage supplied to the amplifier 298.

An alternate form of computer unit which may be controlled either by an A.C. or a D.C. voltage is illustrated in FIG. 10. The source of the control voltage is represented in FIG. 10 by block 306 which is connected by leads 307 to the amplifier 308, forming part of a servo-system. If the control voltage is a D.C. voltage, the amplifier 308 would be different from the type of amplifier employed when the control voltage is A.C. voltage, but both types of amplifiers and their connections are well known to those skilled in the art. The amplifier 308 is electrically connected to a selsyn 309 and to a servo-motor 310 by the leads 311 and 312. In the case of D.C., the selsyn can be replaced by a D.C. source and a potentiometer. The selsyn 309 and the motor 310 are connected by a shaft 313. The proper energizing voltage is supplied to the selsyn 309 from the power source 314, this source is of the same type as that supplying the control voltage unit 306.

The motor 310 has an output shaft 315 whose position is controlled by the control voltage supplied to the amplifier 308. An indicator indicated schematically at 316 is connected with the shaft 315 to indicate the output of the measuring apparatus or sensing unit which supplies the control voltage. The shaft 315 turns a worm 317 which in turn, drives the worm gear 318 mounted on a shaft 319. The shaft 319 is also connected to a differential gear unit 320. A further shaft 321 of the differential unit 320 is connected to a worm gear 322 which is driven by a worm 323. The worm 323 may be manually rotated by the wheel 324. The output shaft 325 of the differential unit 320 is provided with an indicator schematically indicated at 326. The shaft 325 is also connected to one of the inputs of the computer units 47 in a manner hereinafter described.

It will be seen from the above that the shaft 325 will rotate an amount which is proportional to the rotation of shaft 319 and to the rotation of the wheel 324. The position of the shaft 325 and hence the effect of the sensing unit output on the safe speed computer may be modified by rotating the wheel 324 in the desired direction.

Figure 11:
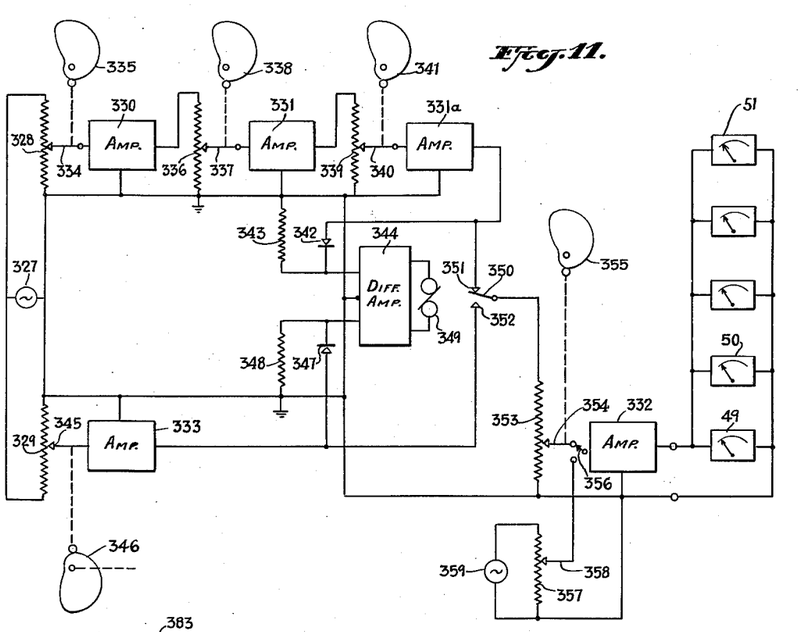
FIG. 11 is a combined block and circuit diagram of a safe speed computer which may be employed in the embodiment of FIG. 1.

FIG. 11 illustrates one form of the computer unit 47. The computer unit shown in FIG. 11 comprises an A.C. voltage source 327 which is connected in parallel with a pair of potentiometers 328 and 329. The unit also includes a plurality of amplifiers 330–333 which preferably are amplifiers having a high input impedance, a low output impedance and unity gain. However, other amounts of gain may be employed providing that the gain is stable and suitable corrections are made to obtain the proper scale factors in the maximum speed indicators 49–51. The slider 334 of the potentiometer 328 is positioned by a rotatable cam 335 so that the input to the amplifier 330 is determined by the position of cam 335.

The output of amplifier 330 is connected to a potentiometer 336 having a slider 337 whose position is determined by the position of rotatable cam 338. Accordingly, cam 338 similarly determines the input voltage for the amplifier 331 whose output is connected to a potentiometer 339 having a slider 340 whose position is determined by a rotatable cam 341.

The slider 340 is connected to amplifier 331a and the output of amplifier 331a is connected in series with a rectifier 342 and a resistor 343. The voltage between the ends of resistor 343, which is a D.C. voltage, has a magnitude which is dependent upon the positions of the cams 335, 338 and 341. This voltage between the ends of resistor 343 is applied to the input of a differential amplifier 344.

The input voltage for the amplifier 333 is controlled by means of a slider 345 forming part of the potentiometer 329 and the position of the slider 345 is controlled by the rotatable cam 346.

The output of the amplifier 333 is connected in series with the rectifier 347 and a resistor 348, and the voltage between the ends of the resistor 348 is applied to the input of the differential amplifier 344. A polar relay 349 is connected to the output of differential amplifier 344 and has an armature 350 which can rest against either contact 351 or contact 352. The coils of the polar relay 349 are connected to the output of the amplifier 344 in such a manner that when the voltage between the ends of resistor 343 is less than the voltage between the ends of resistor 348, the armature 350 rests against the contact 351. In this position of the armature 350 the potentiometer 353 is connected to the output of amplifier 331a so that the voltage applied to the ends of the potentiometer 353 is determined by the positions of the cams 335, 338 and 341. On the other hand, when the voltage across the resistor 348 is smaller than the voltage of the resistor 343, the armature 350 rests against contact 352, applying the output voltage of amplifier 333 to the potentiometer 353.

The potentiometer 353 has a slider 354 whose position is controlled by a cam 355. The input of amplifier 332 is connected to a switch 356 which, in the position shown in FIG. 11, connects the input of amplifier 332 between one end of potentiometer 353 and slider 354.

The output of amplifier 332 is connected to the maximum safe speed display units 49, 50, 51, etc. which may, for example, be voltage measuring meters. To permit manual control of the indications of the safe speed display units 49, 50, 51, etc., the switch 356 may be moved to the other contact associated therewith so that the input of the amplifier 332 is connected to one end of potentiometer 357 and to slider 358. Potentiometer 357 is connected to a voltage source 359 so that by moving the slider 358 manually, the readings of the safe speed display units may be varied.

Before considering the operation of the computer, the manner in which the various parameters affect the maximum safe speed should be considered. If it is assumed that the road surface is dry, the work done by the brakes of a vehicle in stopping such vehicle must be equal to the kinetic energy of the vehicle and, hence:

(1) $\quad DF_M = \tfrac{1}{2}MS^2$ where

D is the distance required to brake vehicle to a full stop.
$F_M$ is the maximum non-skidding force exerted by the brakes on the road.
M is the mass of the vehicle.
S is the speed of the vehicle.

In practice, it must be assumed that only a fraction of the maximum braking force can be applied without causing discomfort and without creating hazardous conditions, and therefore:

(2) $\quad bDF_M = \tfrac{1}{2}MS^2$ where "b" represents a safety factor.

Under adverse conditions, i.e., when there is moisture, snow, sleet, frost, etc. on the road surface, the adhesion between the vehicle wheels or tires and the surface is reduced, and hence the force which can be applied is reduced by a factor "a." Equation 2 then becomes:

(3) $\quad abDF_M = \tfrac{1}{2}MS^2$

The braking distance should be equal to or less than the maximum visibility distance "V" so that:

(4) $\quad D \leq V$ but since Equation 3 includes a safety factor "b," it is permissible for "DD" to equal "V." Equation 3 then becomes:

(5) $\quad abCF_M = \tfrac{1}{2}MS^2$ or (6) $\quad S^2 = aV2b\left(\dfrac{F_M}{M}\right)$ where the last term represents the maximum braking force per unit of weight of the vehicle, i.e. the maximum deceleration. The term $$b\left(\dfrac{F_M}{M}\right)$$

represents the maximum practical deceleration and is determined from tests under controlled deceleration conditions. If we let (7) $\quad K = 2b\left(\dfrac{F_M}{M}\right)$ then Equation 6 becomes:

(8) $\quad S^2 = aKV$ where "K" is a constant. The maximum safe speed, considering only the above factors, is:

(9) $\quad S = \sqrt{aKV}$

The general illumination "I" affects primarily the visibility and particularly the ability to determine whether vehicles which are ahead on the road are moving fast or slow or are standing still. Thus, the "effective" visibility is reduced when the illumination is poor and vice versa. The effective visibility "$V_e$" is then:

(10) $\quad V_e = VR(I)$ where "R(I)" is an empirical function of the illumination and is generally less than unity. If we substitute "$V_e$" for "D" in Equation 3

(11) $\quad S^2 = aKVR(I)$

Equation 11 is good as long as all of the vehicles in the section are traveling at the same order of speed. However, if there is a vehicle in the section traveling at a relatively slow speed, the maximum safe speed is reduced by a factor "z" so that (11) becomes:

(12) $\quad S^2 = zaKVR(I)$ (12a) $\quad S = \sqrt{zaKVR(I)}$

The maximum safe speed also is affected by the traffic density and Equation 12 is no longer valid when the average spacing between vehicles becomes less than "$V_e$." In this case the required braking distance should be determined from vehicle spacing rather than from visibility and illumination. The average spacing may be determined from:

(13) $\quad p = \dfrac{nL}{N}$ where p is the average spacing
L is the length of road section
N is the number of vehicle in the section
n is the number of road lanes.

As a result of bunching the probable spacing is reduced by a factor "y" which is an empirical factor less than unity so that:

(14) $\quad p = \dfrac{ynL}{N}$

From this, substituting in (3)

(15) $\quad pabF_M = \tfrac{1}{2}MS^2$ and (16) $\quad S^2 = pa2b\left(\dfrac{F_M}{M}\right) = aKp$ (16a) $\quad S = \sqrt{aKp}$ Accordingly, for high traffic density, the maximum safe speed should be determined from (16) instead of (12).

As mentioned above, the output shafts of the computer input units are connected to cams 335, 338, 341, 346, and 355. If the rotation of the shafts of the computer input units varies in the desired manner in relation to the parameter which is to control determination of the maximum safe speed or if the potentiometers 328, 329, 336, 339, and 353 are wound so as to provide the desired relationship, then the cams may have the shapes necessary merely to move the sliders of the potentiometers in a manner proportional to the rotation of the computer input unit shafts or the shafts may directly control the sliders on potentiometers.

On the other hand, if the rotation of the shafts is not so related to the parameters or if the potentiometers are not so wound, the cams may be shaped so as to provide the desired movement of the sliders of the potentiometers. Also, by varying the shape of the cams or by providing interchangeable cams, the effect of the various parameters on the various safe speeds may be varied in accordance with any desired relationship and may be changed from time to time.

As pointed out above, the maximum safe speed may be determined from either Equation 12 or Equation 16. Accordingly, it is the function of the computer to provide voltages at the output of amplifier 332 which vary in accordance with either Equation 12 or Equation 16.

The computer input units for the visibility measuring apparatus, the illumination measuring apparatus and the speed measuring apparatus may be connected to the cams 335, 338 and 341. For example, the output shaft of computer input unit 24 may be connected to cam 335, the output shaft of the computer input unit 26 may be connected to cam 338, and the output shaft of the computer input unit 27 may be connected to cam 341. The output shaft of the computer input unit 23, which is controlled in position by the traffic density measuring apparatus, may be connected to the cam 346 and the output shaft of the computer input unit 25, whose position is controlled by the adhesion measuring apparatus 13 may be connected to cam 355.

If it is assumed that the source 327 provides a voltage $E_0$ and if the cams 335, 338 and 341 are so shaped as to position sliders 334, 337 and 340 respectively in accordance with the terms "V," "R(I)" and "z," as defined in Equation 12, then it will be seen that the voltage between slider 340 and one end of potentiometer 339 has the following value:

(17) $\quad E_1 = E_0 z V R(I)$

On the other hand, the cams 335, 338 and 341 may be so shaped as to vary the sliders 334, 337 and 340 in proportion to the "$\sqrt{V}$," "$\sqrt{R(I)}$" and "$\sqrt{z}$" so that the voltage between the slider 340 and one end of the potentiometer 339 has the following value:

(18) $\quad E_1 = E_0 \sqrt{z V R(I)}$

Similarly, cam 355 may be shaped to vary the position of slider 354 in proportion to the term "$a$" of Equation 12 or the square root of "$a$" so that the voltage at the input of amplifier 332 has one of the following values:

(19) $\quad E_2 = E_0 z a V R(I) K$ (19a) $\quad E_2 = E_0 \sqrt{z a V R(I)} K$ it being assumed that a voltage ratio corresponding to the term "K" has been introduced in one of the circuits of the computer.

Assuming that the cam 346 is shaped so as to vary the position of the slider 345 in proportion to the term "$p$" or the square root of "$p$," it may be shown by similar analysis that when the armature 350 is against contact 352 the voltage at the input of amplifier 332 has one of the following values:

(20) $\quad E_3 = E_0 a k p$ (20a) $\quad E_3 = E_0 \sqrt{a k p}$

Accordingly, the output voltage of the amplifier 332 will vary with either $S^2$ or $S$ and will vary in accordance with Equation 12, 12a, 16, or 16a, depending upon the position of armature 350 and upon the choice of the shapes of the cams. In either case, the scales of the indicating units 49, 50, 51, etc. would be calibrated to read the maximum safe speed directly and will indicate speeds which are determined by the visibility, illumination, slowest vehicle speed and adhesion or, if the traffic density is high, will indicate speeds which are dependent upon the traffic density and adhesion.

Figure 12:
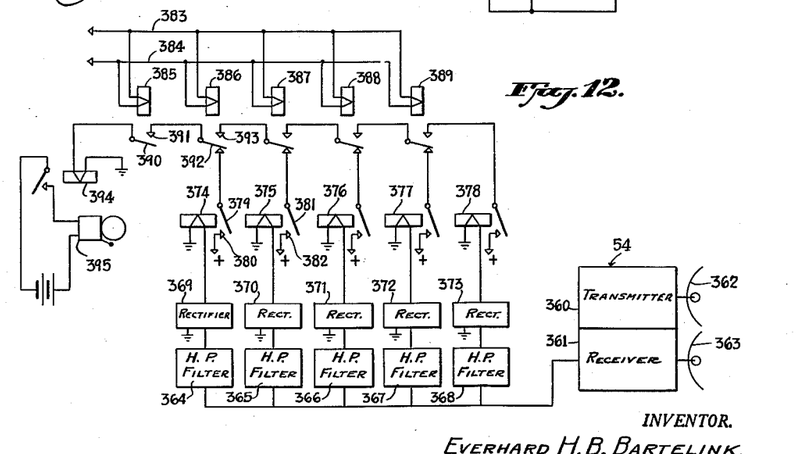
FIG. 12 is a combined block and circuit diagram of one form of excess speed indicating apparatus which may be employed in the embodiment of FIG. 1.

As mentioned in connection with FIG. 1, the output of the maximum safe speed computer 47 may be used to control excess speed indicating apparatus 53. One form of the excess speed indicating apparatus is illustrated in FIG. 12. Referring to this figure, the speed measuring apparatus 54 includes a transmitter 360 and a receiver 361 connected to antennas 362 and 363, such apparatus being of the type described in connection with FIG. 8. The output of receiver 361 is connected to a plurality of highpass filters 364–368 and the outputs of the filters 364–368 are connected to rectifiers 369–373. Each of the filters 364–368 has a different cut-off frequency so as to pass signals of different frequencies which appear at the output of the receiver 361 when a vehicle is within the range of the speed measuring apparatus 54. For example, the filter 364 will pass signals having frequencies above the frequency of the signal corresponding to a vehicle moving at twenty miles per hour, filter 365 will pass signals having frequencies above the frequency of the signal corresponding to a vehicle moving at thirty miles per hour, etc. The rectifiers 369–373 are connected to relays 374–378 respectively, and when a signal above the cut-off frequency of filter 364 is applied to the input of filter 364, it will be rectified by rectifier 369 and will cause relay 374 to draw its armature 379 against contact 380. If the frequency of the signal is sufficiently high it will also operate relay 375, drawing its armature 381 against contact 382. However, if the signal frequency is below the cut-off frequency of filter 365, only relay 374 will be energized. It will be apparent, then, that the relays of the group 374–378 which will be operated by a signal at the output of receiver 361 will be dependent upon the frequency of such signal and hence will be dependent upon the speed of the fastest moving vehicle within the range of the speed measuring apparatus 54.

The leads 383–384 are connected to the output of the amplifier 332 and are connected to the coils of relays 385–389. The relays 385–389 are voltage magnitude sensitive so that relay 385 will draw its armature 390 up against its contact 391 when the voltage between leads 383 and 384 is of relatively low magnitude. Relay 386 will draw its armature 392 up against contact 393 when the voltage between leads 383 and 384 exceeds a predetermined magnitude which is greater than the magnitude required to operate armature 390. Similarly, relays 387, 388 and 389 operate their armatures when the voltage between leads 383 and 384 has successively greater magnitudes. From this it will be seen that the armatures of the relays 385–389 which are operated, will be dependent upon the maximum safe speed.

If it is assumed that the armature of relay 385 is operated when the maximum safe speed is approximately twenty miles per hour and if it is assumed that filter 364 passes signals having frequencies corresponding to vehicle speeds slightly above twenty miles per hour, it will be seen that if a vehicle within the range of the speed measuring apparatus has a speed greater than twenty miles per hour, relay 394 will be energized, causing operation of the indicator or alarm 395 which will indicate to an operator, that a vehicle within the range of the apparatus 54 has exceeded the maximum safe speed as determined by the maximum safe speed computer.

Operation of the armature 392 transfers the control of the relay 394 to relay 375 which in turn is controlled by the output of filter 365. Accordingly, if the armature 392 is operated when the maximum safe speed is approximately thirty miles per hour and if the filter 365 passes signals having frequency corresponding to vehicle speeds slightly higher than frequencies passed by filter 364, the relay 394 will be operated when a vehicle within the range of the speed measuring apparatus exceeds a speed of thirty miles per hour. The relays 387–389 and the filters 366–368 function in a similar manner to operate the indicator or alarm 395 whenever a vehicle within the range of the speed measuring apparatus 54 exceeds the maximum safe speed as determined by the maximum safe speed computer.

Although I have illustrated the use of separate speed measuring apparatus 54 in connection with the excess speed apparatus of FIG. 11, it will be apparent that the output of receiver 252 (FIG. 8) used in connection with the measurement of slow moving vehicles may be connected to the inputs of filters 364–368 to provide the desired signals for operation of the excess speed indicator 395. In this case, the apparatus 54 may be omitted.

Having thus described my invention with particular reference to the preferred form thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed as new and desired to be secured by Letters Patent is:

1. A traffic control system comprising means for measuring the number of vehicles in a predetermined section of a highway, means for measuring the visibility in such section, means for measuring the illumination in said section, means for measuring the adhesion between the wheels of a vehicle and the surface of said section, means for measuring the speeds of vehicles in said section, means connected to said speed measuring means for determining the speed of the slowest vehicle in said section, means connected to each of said measuring means and controlled thereby for computing the predetermined maximum safe speed in said section under the conditions as measured by said measuring means, indicating means connected to the output of said computing means and controlled thereby for indicating said speed, and excess speed indicating means connected to said speed measuring means and to the output of said computing means for comparing the speeds of vehicles in said section with the computed maximum safe speed and for indicating the presence of a vehicle having a speed in excess of said maximum safe speed.

2. A traffic control system comprising means for measuring the number of vehicles in a predetermined section of a highway, means for measuring the visibility in such section, means for measuring the illumination in said section, means for measuring the adhesion between the wheels of a vehicle and the surface of said section, means for measuring the speed of the slowest vehicle in said section, means connected to each of said measuring means and controlled thereby for computing the predetermined maximum safe speed in said section under the conditions as measured by said measuring means, indicating means connected to the output of said computing means and controlled thereby for indicating said speed, further means for measuring the speeds of vehicles in said section, and excess speed indicating means connected to said further means and to the output of said computing means for comparing the speeds of vehicles in said section with the computed maximum safe speed and for indicating the presence of a vehicle having a speed in excess of said maximum safe speed.

3. A traffic control system comprising means for measuring the visibility along a predetermined section of a highway comprising a plurality of spaced light sources, means connected to said sources for periodically energizing said sources in succession, first means disposed adjacent each source for detecting the light emitted by the associated source, second means spaced from said sources for detecting the light emitted by said sources, each source being spaced a different distance from said second means and means jointly controlled by said first and said second means for providing a voltage which is related to the number of sources whose light is detected by said second means.

4. A traffic control system comprising means for measuring the visibility along a predetermined section of a highway comprising a plurality of spaced light sources, means connected to said sources for periodically energizing said sources in succession, first means disposed adjacent each source for detecting the light emitted by the associated source, second means spaced from said sources for detecting the light emitted by said sources, each source being spaced a different distance from said second means, means jointly controlled by said first and said second means for providing a voltage which is related to the number of sources whose light is detected by said second means, computing means connected to said voltage providing means and controlled thereby for computing the safe speed in said section, and indicating means connected to said computing means for indicating said safe speed.

5. A traffic control system comprising means for measuring the visibility along a predetermined section of a highway comprising a plurality of spaced light sources, means connected to said sources for periodically energizing said sources in succession, first means disposed adjacent each source for detecting the light emitted by the associated source, second means spaced from said sources for detecting the light emitted by said sources, each source being spaced a different distance from said second means and indicating means jointly controlled by said first and said second means for providing an indication which is related to the number of sources whose light is detected by said second means.

6. Visibility measuring means comprising a plurality of spaced light sources, means connected to said sources for periodically energizing said sources in succession, first means disposed adjacent each source for detecting the light emitted by said source, second means spaced from said sources for detecting the light emitted by said sources, each source being spaced a different distance from said second means and means connected to and jointly controlled by said first and said second means.

7. A traffic control system comprising means for measuring the speeds of a plurality of vehicles in a predetermined section of a highway, means connected to said measuring means for providing a voltage which is proportional to the speed of only the slowest one of said vehicles, computing means connected to said last-mentioned means and controlled thereby for computing a predetermined safe speed in said section and indicating means connected to said computing means for indicating said safe speed.

8. A traffic control system comprising a plurality of means for measuring predetermined conditions in a section of a highway; indicating means; computing means comprising a plurality of voltage sources having control means for varying the output thereof and differential connecting means connected to said sources and controlled thereby and connected to said indicating means, said connecting means connecting said indicating means to one of said sources when the output of one of said sources has a predetermined relation to the output of the other of said sources and vice versa; and means connecting the control means of said one source to one of said measuring means and means connecting the control means of said other source to another of said measuring means whereby said indicating means is controlled by alternate ones of said measuring means.

9. A traffic control system comprising a voltage source having control means for varying a characteristic of the output voltage of said source, means for varying said control means in accordance with the safe speed in a predetermined section of a highway, said speed being predetermined by and variable with predetermined conditions on said highway, a plurality of voltage responsive means connected to said source, each of said last-mentioned means being responsive to a different value of the characteristic of the voltage of said source, means for measuring the speeds of vehicles in said section, a plurality of speed responsive means connected to said speed measuring means, one of said speed responsive means being responsive to said measuring means when the speed of a vehicle in said section exceeds a predetermined speed and another of said speed responsive means being responsive to said measuring means when the speed of a vehicle in said section exceeds a different predetermined speed and means connected to said voltage responsive means and to said speed responsive means and jointly controlled thereby for indicating the presence of a vehicle in said section having a speed in excess of said safe speed.

10. A traffic control system comprising means for measuring the visibility along a predetermined section of a highway comprising stationary light generating means for directing light along a plurality of different paths, stationary light detecting means spaced from said light generating means and mounted in said paths, said detecting means being responsive to the light emitted by said light generating means along said paths and the length of each said path between said light generating means and said detecting means being different from the length of the remaining paths, switching means for causing said detecting means to respond periodically and successively to the light directed along each different one of said paths, and means connected to said detecting means and connected to and controlled by said switching means for indicating the longest one of said paths along which a predetermined amount of light is received by said detecting means.

11. A traffic control system comprising means for measuring the number of vehicles in a predetermined section of a highway including means for counting the number of vehicles entering said section, means for counting the number of vehicles leaving said section, and means controlled by said counting means for providing an output which is related to the difference between the number of vehicles entering and the number of vehicles leaving said section; means for measuring the visibility in said section including means for projecting light along a plurality of paths of different lengths, means for detecting the light projected along each said path and means for providing an output related to the longest of said paths along which light of a predetermined intensity is detected by said detecting means; means for measuring the adhesion between the wheels of a vehicle and the surface of such section including a wheel engageable with said surface of said section and movable with respect thereto for thereby directly measuring and providing an output related to the condition of said surface; each of said measuring means measuring at least three different values of the condition measured thereby and providing a different output for each of said values; computing means connected to each of said measuring means and controlled by the outputs thereof for computing the predetermined maximum safe speed in said section for each different output of said measuring means; and means for indicating the safe speed mounted adjacent said section and visible to operators of said vehicles, said indicating means being connected to the output of said computing means and controlled thereby.

References Cited in the file of this patent

UNITED STATES PATENTS

| | | |
|---|---|---|
| 1,561,837 | Dowling | Nov. 17, 1925 |
| 1,788,111 | Knowles | Jan. 6, 1931 |
| 2,046,005 | McMaster | Jan. 12, 1937 |
| 2,087,039 | McMaster | July 13, 1937 |
| 2,096,025 | Bell | Oct. 19, 1937 |
| 2,182,530 | Baer | Dec. 5, 1939 |
| 2,198,971 | Neufeld | Apr. 30, 1940 |
| 2,240,800 | Rigert | May 6, 1941 |
| 2,241,998 | Iwasaki | May 13, 1941 |
| 2,250,333 | Miller | July 22, 1941 |
| 2,277,692 | Dunmore | Mar. 31, 1942 |
| 2,301,247 | Bronee | Nov. 10, 1942 |
| 2,362,971 | Bosch | Nov. 21, 1944 |
| 2,477,567 | Barker | Aug. 2, 1949 |
| 2,491,542 | Woodward | Dec. 20, 1949 |
| 2,503,023 | Berry | Apr. 4, 1950 |
| 2,535,274 | Dicke | Dec. 26, 1950 |
| 2,562,181 | Frommer | July 31, 1951 |
| 2,629,865 | Barker | Feb. 24, 1953 |
| 2,690,668 | Lucas | Oct. 5, 1954 |
| 2,695,404 | Barker | Nov. 23, 1954 |
| 2,700,297 | Allen | Jan. 5, 1955 |
| 2,704,936 | Vine | Mar. 29, 1955 |
| 2,847,080 | Zworykin | Aug. 12, 1958 |
| 2,849,701 | Clark | Aug. 26, 1958 |

FOREIGN PATENTS

| | | |
|---|---|---|
| 436,883 | Great Britain | Oct. 21, 1935 |
| 467,082 | Italy | Nov. 26, 1951 |